United States Patent
Zhu

(10) Patent No.: US 12,262,412 B2
(45) Date of Patent: Mar. 25, 2025

(54) METHOD, DEVICE AND APPARATUS FOR DETERMINING CHANNEL DETECTION MECHANISM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 463 days.

(21) Appl. No.: 17/439,947

(22) PCT Filed: Mar. 20, 2019

(86) PCT No.: PCT/CN2019/078927
§ 371 (c)(1),
(2) Date: Sep. 16, 2021

(87) PCT Pub. No.: WO2020/186490
PCT Pub. Date: Sep. 24, 2020

(65) Prior Publication Data
US 2022/0248461 A1    Aug. 4, 2022

(51) Int. Cl.
H04W 74/08    (2024.01)
H04W 72/12    (2023.01)
H04W 74/0808    (2024.01)

(52) U.S. Cl.
CPC ....... *H04W 74/0808* (2013.01); *H04W 72/12* (2013.01)

(58) Field of Classification Search
CPC .......................... H04W 74/0808; H04W 72/12

USPC .......................................................... 370/329
See application file for complete search history.

(56) References Cited

U.S. PATENT DOCUMENTS

| | | | |
|---|---|---|---|
| 2017/0118728 A1* | 4/2017 | Harada | H04W 72/23 |
| 2018/0103380 A1* | 4/2018 | Ode | H04W 76/10 |
| 2018/0352573 A1* | 12/2018 | Yang | H04W 16/14 |
| 2021/0100033 A1* | 4/2021 | Li | H04W 74/004 |
| 2021/0203528 A1* | 7/2021 | Park | H04L 5/0039 |
| 2022/0070922 A1* | 3/2022 | Talarico | H04W 74/0808 |
| 2022/0078845 A1* | 3/2022 | Xu | H04W 72/0446 |

(Continued)

FOREIGN PATENT DOCUMENTS

| | | |
|---|---|---|
| CN | 106658742 A | 5/2017 |
| CN | 109417800 A | 3/2019 |
| EP | 3439413 A1 | 2/2019 |

(Continued)

OTHER PUBLICATIONS

European Patent Application No. 19919733.6, Search and Opinion dated Sep. 23, 2022, 8 pages.

(Continued)

*Primary Examiner* — Faisal Choudhury
(74) *Attorney, Agent, or Firm* — Cozen O'Connor

(57) ABSTRACT

A method, device, apparatus, and storage medium for determining a channel detection mechanism relate to the technical field of communications. The method implements uplink transmission through an uplink channel of an unlicensed spectrum and includes: receiving, by a terminal, notification information from a base station; and determining, by the terminal, a channel detection mechanism for the uplink transmission based on the notification information.

6 Claims, 7 Drawing Sheets

(56) References Cited

U.S. PATENT DOCUMENTS

2022/0346147 A1* 10/2022 Wang .................. H04W 74/002

FOREIGN PATENT DOCUMENTS

| EP | 3439414 A1 | 2/2019 |
|---|---|---|
| JP | 2019507537 A | 3/2019 |
| WO | WO 2016103533 A1 | 6/2016 |
| WO | WO 2017117989 A1 | 7/2017 |

OTHER PUBLICATIONS

Japanese Patent Application No. 2021-555560, Office Action dated Sep. 16, 2022, 4 pages.
Japanese Patent Application No. 2021-555560, English translation of Office Action dated Sep. 16, 2022, 4 pages.
Korean Patent Application No. 10-2021-7033760, Office Action dated Nov. 22, 2022, 5 pages.
Korean Patent Application No. 10-2021-7033760, English translation of Office Action dated Nov. 22, 2022, 5 pages.
Russian Patent Application No. 2021129949, Office Action dated Jun. 22, 2022, 14 pages.
Russian Patent Application No. 2021129949, English translation of Office Action dated Jun. 22, 2022, 9 pages.
Indian Patent Application No. 202147047117, Office Action dated Mar. 18, 2022, 6 pages.
PCT/CN2019/078927 English translation of the International Search Report dated Dec. 25, 2019, 2 pages.
Japanese Patent Application No. 2023-043015, Office Action dated Dec. 22, 2023, 4 pages.
Japanese Patent Application No. 2023-043015, English translation of Office Action dated Dec. 22, 2023, 4 pages.
Nokia et al. "Feature Lead's Summary on Channel Access Procedures" 3GPP TSG RAN WG1#95, R1-1813994, Nov. 2018, 8 pages.
Japanese Patent Application No. 2023-043015, Office Action Jun. 28, 2024, 4 pages.
Japanese Patent Application No. 2023-043015, English translation of Office Action dated Jun. 28, 2024, 3 pages.
Mediatek Inc. "CAPC for RACH and PUCCH in NR-U" 3GPP TSG-RAN2#105 meeting Tdoc R2-1900247, Feb.-Mar. 2019, 4 pages.
Qualcomm Incorporated "Channel access procedures for NR unlicensed" 3GPP TSG RAN WG1 Meeting #AH1901, R1-1900873, Jan. 2019, 14 pages.
Japanese Patent Application No. 2023-043015, Office Action dated Jan. 7, 2025, with English translation, 9 pages.

* cited by examiner

METHOD, DEVICE AND APPARATUS FOR DETERMINING CHANNEL DETECTION MECHANISM, AND STORAGE MEDIUM

CROSS-REFERENCE TO RELATED APPLICATION

This application is a national phase of International Application No. PCT/CN2019/078927, filed on Mar. 20, 2019, the entire contents of which are incorporated herein by reference.

TECHNICAL FIELD

The disclosure relates to the field of communication, and particularly to a method, an apparatus and a device for determining a channel detection mechanism, and a storage medium.

BACKGROUND

The third generation partnership project (3GPP) proposes the use of an unlicensed spectrum through a license assisted access (LAA) mechanism. That is, a licensed spectrum is configured to assist implementation of the use of an unlicensed spectrum.

A channel detection mechanism is introduced in the LAA. That is, a terminal needs to detect whether an uplink channel is in an idle state when performing an uplink transmission. Data may be transmitted only if the uplink channel is in the idle state.

Signalings or data of uplink transmission may be in various forms, and transmission priorities of different signalings or data may vary. Since a channel detection mechanism may be in various forms, there is still no solution about how to select a reasonable channel detection mechanism for different uplink transmissions.

SUMMARY

According to one aspect of the disclosure, a method for determining a channel detection mechanism is provided. The method is applicable to a scenario of uplink transmission through an uplink channel of an unlicensed spectrum, and includes: receiving, by a terminal, notification information from a base station; and determining, by the terminal, a channel detection mechanism for the uplink transmission based on the notification information.

According to another aspect of the disclosure, a method for determining a channel detection mechanism is provided. The method is applicable to a scenario of uplink transmission through an uplink channel of an unlicensed spectrum, and includes: determining, by a terminal, a type of the uplink transmission in response that a channel occupation duration corresponding to the uplink transmission is initiated by the terminal; and determining, by the terminal, a channel detection mechanism corresponding to the type based on a corresponding relationship.

According to another aspect of the disclosure, a method for determining a channel detection mechanism is provided. The method is applicable to a scenario of uplink transmission through an uplink channel of an unlicensed spectrum, and includes: generating, by a base station, notification information for indicating a channel detection mechanism for the uplink transmission; and transmitting, by the base station, the notification information to a terminal.

According to another aspect of the disclosure, a terminal is provided. The terminal includes: a processor; a transceiver coupled to the processor; and a memory configured to store instructions executable by the processor; in which, the processor is configured to load and execute the instructions executable to perform the method for determining the channel detection mechanism, executed by the terminal side, as described above.

According to another aspect of the disclosure, a base station is provided. The base station includes: a processor; a transceiver coupled to the processor; a memory configured to store instructions executable by the processor; in which, the processor is configured to load and execute the instructions executable to perform the method for determining the channel detection mechanism as described above.

According to another aspect of the disclosure, a computer-readable storage medium is provided. The computer-readable storage medium stores at least one instruction, at least one program, a code set or an instruction set, the at least one instruction, the at least one program, the code set or the instruction set being loaded and executed by a processor to perform the method for determining the channel detection mechanism as described in the above aspects.

BRIEF DESCRIPTION OF THE DRAWINGS

In order to explain the technical solutions in embodiments of the disclosure more clearly, the drawings described in the embodiments will be briefly introduced below. Obviously, the drawings described as below are only some embodiments of the disclosure. Those skilled in the art may obtain other drawings from these drawings without creative work.

DETAILED DESCRIPTION

In order to make purposes, technical solutions and advantages of the disclosure clearer, embodiments of the disclosure will be further described below by combining with the drawings.

In order to ensure coexistence with other wireless systems on the unlicensed spectrum, for example, coexistence with a wireless fidelity (Wi-Fi) system, a channel detection mechanism is also introduced in the LAA before data transmission. Before an introduction of embodiments of the disclosure, a channel detection mechanism involved in the disclosure is briefly introduced.

The channel detection mechanism generally includes the following.

First (Cat.1): no Listen before talk (LBT) is performed, that is, a wireless communication device directly transmits information without detecting a channel before transmitting information. The LBT may be referred to as a listen backoff mechanism configured to implement effective sharing of the unlicensed spectrum. The LBT requires to listen to the channel for a clear channel assessment (CCA) before transmitting information, and perform transmission when the channel is in the idle state.

Second (LBT Cat.2): an LBT mechanism without a random backoff. A wireless communication device detects within one time granularity before transmitting information, for example, this time granularity may be 25 μs. When the channel within this time granularity is idle, the wireless communication device may transmit information; or else, the LBT fails to be executed, and the wireless communication device may not transmit information.

Figure 1:
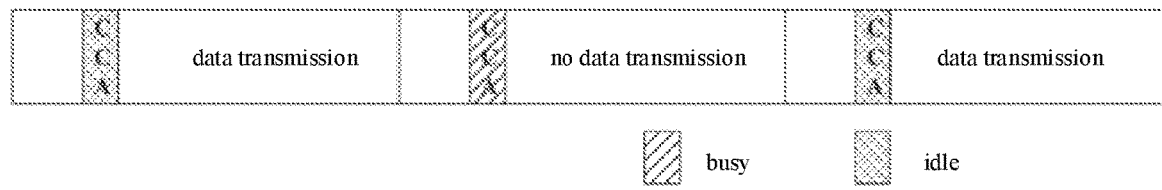
FIG. 1 is a diagram illustrating channel listening of a LBT Cat.2 in the disclosure.

As illustrated in FIG. 1, the wireless communication device executes the CAA listening within a one-slot. When the listening result of the channel within a first CCA time slot and a third CCA time slot is idle, the wireless communication device may occupy the channel for data transmission; when the listening result of the channel within a second CCA time slot is busy, the wireless communication device may not occupy the channel for data transmission, that is, no data transmission for short.

Third (LBT Cat.3): an LBT mechanism with a random backoff and a fixed contention window size (CWS). The transmitting device detects whether the channel is idle within a first time granularity first; when it is detected that the channel is idle, a value N of a random number is selected within a first contention window, and a second time granularity is taken as a time granularity for channel detection; when it is detected that the channel is idle within the second time granularity, and the value of the random number is not 0, 1 is subtracted from the value of the random number, and the second time granularity continues to be taken as the time granularity for channel detection; when it is detected that the channel is busy within the second time granularity, the first time granularity is taken as the time granularity again for channel detection; when it is detected that the channel is idle again within the first time granularity, and the value of the random number is not 0, 1 is subtracted from the value of the random number, and the second time granularity restores to be taken as the time granularity for channel detection; until the value of the random number is reduced to 0, it may represent that the channel is idle.

Fourth (LBT Cat.4): an LBT mechanism with a random backoff and a variable CWS. That is, on the basis of LBT Cat.3, the transmitting device may adjust the CWS based on the previous transmission result. For example, the ratio of data that are not properly received to the transmitted data within a reference duration in the previous transmission process is X. When X is greater than a threshold, the value of the CWS increases. To refine parameter settings during the LBT process, four priorities are configured in LBT Cat.4. Each priority corresponds to different parameter configurations, and data transmissions of different service types correspond to different priorities.

The principle of LBT Cat.4 is as follow: the wireless communication device detects whether the channel is idle within a first time granularity first; when it is detected that the channel is idle, a value N of a backoff counter (referred to as a random number) is selected within a first contention window, and a second time granularity is taken as a time granularity for channel detection; when it is detected that the channel is idle within the second time granularity, and a value of the backoff counter is not 0, 1 is subtracted from the value of the backoff counter, and the second time granularity continues to be taken as the time granularity for channel detection; when it is detected that the channel is busy within the second time granularity, the first time granularity is taken as the time granularity again for channel detection; when it is detected that the channel is idle again within the first time granularity, and the value of the backoff counter is not 0, 1 is subtracted from the value of the backoff counter, and the second time granularity restores to be taken as the time granularity for channel detection; until the value of the backoff counter is reduced to 0, it may represent that the channel is available to be occupied.

Figure 2:
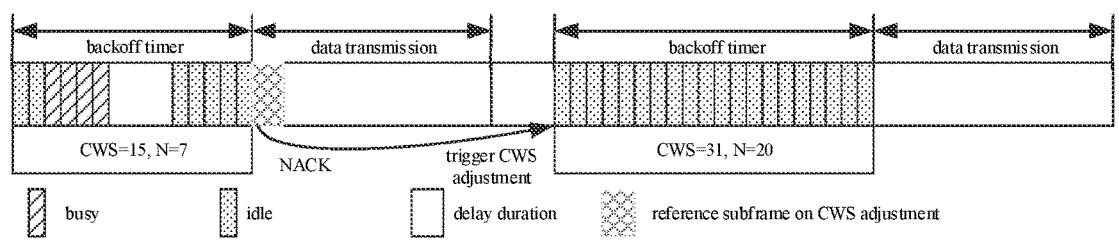
FIG. 2 is a diagram illustrating channel listening of a LBT Cat.4 in the disclosure.

As illustrated in FIG. 2, the wireless communication device evenly and randomly generates a backoff counter N between 0~a contention windows size (CWS), and listens with the CCA slot as the granularity. Taking CWS=15 and N=7 corresponding to the first physical downlink shared channel (PDSCH) as an example, in the first and second CCA slots, the listening result of the channel is idle, and N is reduced to 5; in the third to the sixth CAA slots, the listening result of the channel is busy, N remains unchanged, and listening is restarted after four CAA slots are delayed; in the eleventh to the fifteenth listening information, the listening result of the channel is idle, N is reduced to 0, and the wireless communication device starts to occupy the channel for data transmission.

In the data transmission process, when the wireless communication device receives a NACK (Negative Acknowledgement) within the reference subframe in CWS adjustment, it represents data transmission failure, and the wireless communication device dynamically increases CWS=31 based on the erroneous receiving state and regenerates a backoff counter N=20, and adopts the increased CWS and the backoff counter N for channel listening before the second PDSCH transmission. And when the listening result of the channel in consecutive 20 CAA slots is idle, the channel is occupied for data transmission.

Different CWSs correspond to different channel access priorities p. In a schematic example, Table-1 illustrates parameter configurations of four priorities of downlink LBT Cat.4, and Table-2 illustrates parameter configurations of four priorities of uplink LBT Cat.4. Both are different in configurations.

TABLE-1

| channel access priority (p) | $m_p$ | $CW_{min,p}$ | $CW_{max,p}$ | $T_{mcot,p}$ | optional value of $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE-2

| channel access priority (p) | $m_p$ | $CW_{min,p}$ | $CW_{max,p}$ | $T_{mcot,p}$ | optional value of $CW_p$ |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

In four channel access priorities as illustrated in Table-1 and Table-2, the smaller the value of p is, the higher the corresponding channel access priority is. $m_p$ is the number of extended clear channels (ECCAs) included in a delay duration. Each delay duration includes a fixed 16 μs duration and $m_p$ ECCAs, that is, the first time granularity described above. $CW_{min,p}$ and $CW_{max,p}$ are a minimum convention window value and a maximum convention window value, and the CWS in the LBT process is generated between these both values. The backoff duration during the channel detection process of the LBT is decided by the backoff counter N randomly generated during 0 to the generated convention window $CW_p$. However, $T_{mcot,p}$ is a maximum duration that LBT Cat.4 corresponding to each priority may occupy the channel after successful execution. As illustrated in the above Tables, compared with priorities 1, 2, the execution duration of the LBT process of priorities 3, 4 is relatively long, and the opportunity of obtaining the channel access is relatively low. To ensure fairness, the maximum transmission duration occupied by data transmission of the both priorities is relatively long.

Fifth: a channel detection mechanism based on a frame structure, that is, a frame based equipment (FBE). For the FBE, a period is set, and the channel detection is performed on the fixed location of each period once, for example, the CCA detection is performed in each CCA detection duration. When it is detected that the channel state is idle, this channel may be occupied for transmission, and the maximum channel occupation duration is fixed until the CAA detection is performed again at the next period of the CAA detection duration; when it is detected that the channel state is not idle, the channel may not be occupied by the wireless communication device within the period until detection is continued at the fixed location of the next period. A fixed period refers to a time domain unit scheduled by the FBE, for example, a fixed period may be a fixed frame period (FFP). The length of the fixed period may be predesignated by a protocol.

It should be noted that, the five channel detection mechanisms are only example introductions. With the evolution of communications technologies, the five channel detection mechanisms may vary or a new channel detection mechanism is generated. However, the above are all suitable for the technical solutions described in the disclosure.

The network architecture and service scenario described in embodiments of the disclosure are intended to explain the technical solutions of embodiments of the disclosure more clearly, and does not constitute a limitation to the technical solutions provided in embodiments of the disclosure. Those skilled in the art may know that, with the evolution of network architecture and the emergence of new service scenarios, the technical solutions provided in embodiments of the disclosure are equally applicable to similar technical issues.

Figure 3:
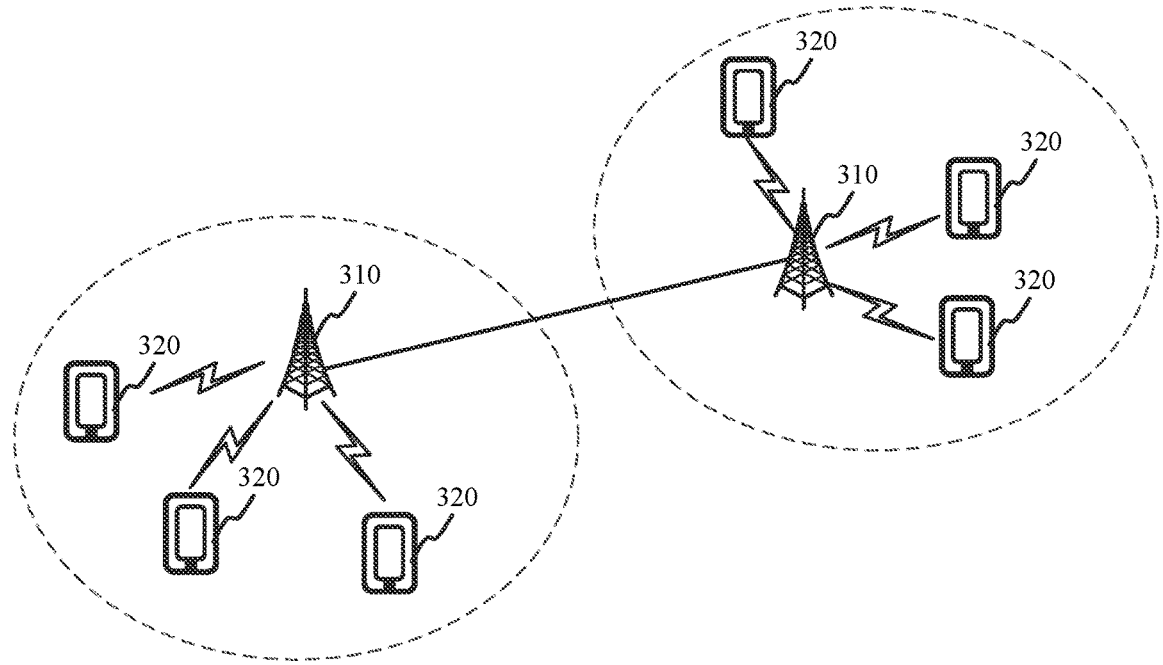
FIG. 3 is a block diagram illustrating a wireless communications system according to an exemplary embodiment of the disclosure.

FIG. 3 is a block diagram illustrating a wireless communications system according to an exemplary embodiment of the disclosure. The wireless communications system may include a base station 310 and a terminal 320.

The base station 310 is deployed in an access network. The access network in a 5G (5th-Generation Mobile Communication Technology) NR (New Radio) system may be referred to as a new generation-radio access network (NG-RAN). The base station 310 and the terminal 320 may communicate with each other through some air interface technologies, such as through a cellular technology.

The base station 310 is a device that is deployed in the access network and provides a wireless communication function for the terminal 320. The base station 310 may include various forms of macro base stations, micro base stations, relay stations, access points, etc. In the system adopting different wireless access technologies, names of the devices with the base station functions may vary, for example, in the 5G NR system, it is referred to as gNodeB or gNB. With the evolution of communication technologies, the name of "base station" may vary. For convenience of description, in embodiments of the disclosure, the above device that provides the wireless communication function for the terminal 320 is collectively referred to as the base station. In other embodiments, the base station 310 also may be an access network device.

The number of terminals 320 is generally multiple, and one or more terminals 320 may be distributed in a cell managed by each base station 310. The terminals 320 may include various handheld devices, vehicle-mounted devices, wearable devices, computing devices, with wireless communication functions, or other processing devices coupled to wireless modems, as well as various forms of user equipment (UE), mobile stations (MS), terminal devices, etc. For convenience of description, in embodiments of the disclosure, the devices mentioned above may be collectively referred to as terminals.

The "5G NR system" in embodiments of the disclosure may be also referred to as a 5G system or an NR system, which may be understood by those skilled in the art. The technical solutions in embodiments of the disclosure may be applicable to the 5G NR system, and also applicable to the subsequent evolved system of the 5G NR system. The 5G NR system may be configured in an LAA scenario.

Figure 4:
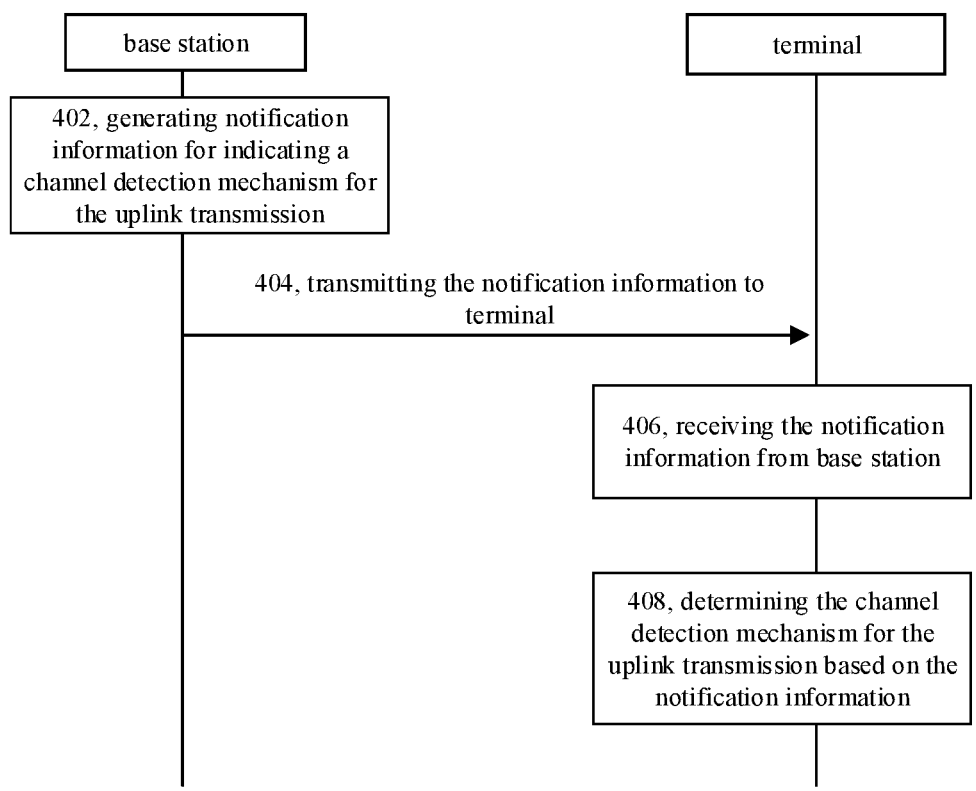
FIG. 4 is a flowchart illustrating a method for determining a channel detection mechanism according to an exemplary embodiment of the disclosure.

FIG. 4 is a flowchart illustrating a method for determining a channel detection mechanism according to an exemplary embodiment of the disclosure. The method may be executed by the wireless communications system as illustrated in FIG. 3. The method may be applicable to a scenario of uplink transmission through an uplink channel of an unlicensed spectrum. The method may include the following.

At block 402, the base station generates notification information. The notification information is configured to indicate a channel detection mechanism for the uplink transmission.

The uplink transmission includes a transmission of an uplink control signaling or a transmission of uplink data. The uplink control signalings may include control signalings carried on a physical uplink control channel (PUCCH) and a physical uplink shared channel (PUSCH), and some pilot signals for measurement. The uplink data may include data carried on the PUSCH.

Transmission priorities of different uplink signalings or uplink data are different. Therefore, channel detection mechanisms used by different uplink signalings or uplink data may be different.

The channel detection mechanism includes but is not limited to any one of the five channel detection mechanisms.

At block 404, the base station transmits the notification information to the terminal.

In optional embodiments, the base station transmits the notification information to the terminal by a high layer signaling. The high layer signaling includes but is not limited to a radio resource control (RRC) signaling, a medium-access-control control element (MAC CE) and a physical layer signaling.

At block 406, the terminal receives the notification information from the base station.

At block 408, the terminal determines the channel detection mechanism for uplink transmission based on the notification information.

In summary, with the method provided in the embodiments, the terminal may receive the notification information from the base station and determine the channel detection mechanism used by the uplink transmission based on the notification information. It may make the terminal accurately determine the channel detection mechanism used by the uplink transmission, thereby achieving fair and efficient occupation of channel resources with other wireless communication systems on the unlicensed spectrum.

The uplink transmission may be classified into two types: an uplink transmission of a configuration type, and an uplink transmission of a scheduling type.

The uplink transmission of the configuration type refers to transmitting by the base station a configuration signaling to a terminal. The terminal keeps using the configuration of the current configuration signaling for the uplink transmission before receiving the next configuration signaling. The configuration signaling is configured to configure a transmission type of uplink transmission, the used time frequency resource, the used cycle, etc. in a static or semi-static way.

The uplink transmission of the scheduling type refers to that the base station dynamically transmits a scheduling signaling to the terminal, and the terminal performs one or more uplink transmissions based on the scheduling of the scheduling signaling. The scheduling signaling is configured to dynamically configure a transmission type of uplink transmission, the used time frequency resource, the used cycle, etc. Optionally, the scheduling signaling is downlink control information (DCI).

Figure 5:
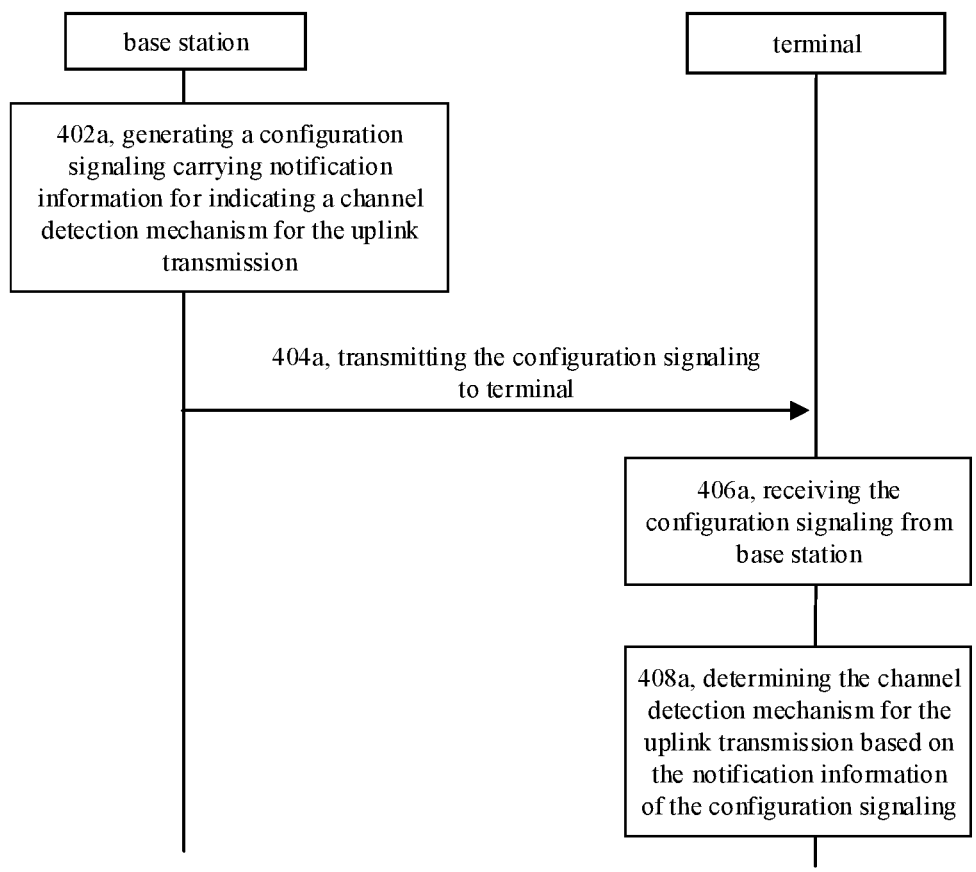
FIG. 5 is a flowchart illustrating a method for determining a channel detection mechanism according to another exemplary embodiment of the disclosure.

Based on optional embodiments in FIG. 4, for the uplink transmission of the configuration type, the method includes the following as illustrated in FIG. 5.

At block 402a, the base station generates a configuration signaling carrying notification information. The notification information is configured to indicate a channel detection mechanism for the uplink transmission.

Optionally, the base station stores a corresponding relationship. The corresponding relationship is relationships between types of uplink transmission and channel detection mechanisms. The base station determines the channel detection mechanism corresponding to the type of the current uplink transmission based on the corresponding relationship, and further generates the notification information.

The configuration signaling is configured to configure the transmission type of uplink transmission, the used time frequency resource, the used cycle, etc. in a static or semi-static way.

In some embodiments, the configuration signaling further carries the notification information.

At block 404a, the base station transmits the configuration signaling to the terminal.

At block 406a, the terminal receives the configuration signaling from the base station.

At block 408a, the terminal determines the channel detection mechanism for the uplink transmission based on the notification information of the configuration signaling.

In summary, with the method provided in the embodiments, the notification information may be carried in the configuration signaling for transmitting, which may reduce the number of signaling interactions required between the base station and the terminal, and improve the communication efficiency between the base station and the terminal.

Figure 6:
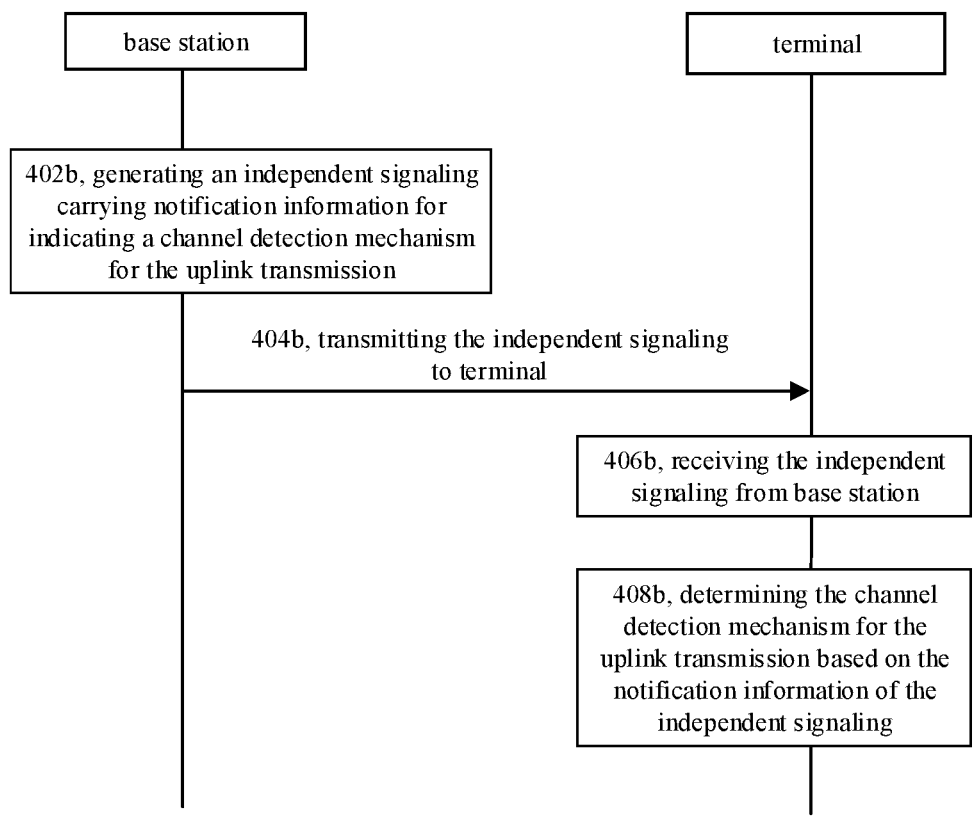
FIG. 6 is a flowchart illustrating a method for determining a channel detection mechanism according to another exemplary embodiment of the disclosure.

Based on optional embodiments in FIG. 4, the uplink transmission of the configuration type is transmitted by an independent signaling. The independent signaling is a signaling different from the configuration signaling. The method includes the following as illustrated in FIG. 6.

At block 402b, the base station generates an independent signaling carrying notification information. The notification information is configured to indicate a channel detection mechanism for the uplink transmission.

Optionally, the base station stores a corresponding relationship. The corresponding relationship is relationships between types of uplink transmission and channel detection mechanisms. The base station determines the channel detection mechanism corresponding to the type of the current uplink transmission based on the corresponding relationship, and further generates the independent signaling carrying the notification information.

At block 404b, the base station transmits the independent signaling to the terminal.

At block 406b, the terminal receives the independent signaling from the base station.

At block 408b, the terminal determines the channel detection mechanism for the uplink transmission based on the notification information of the independent signaling.

In summary, with the method provided in the embodiments, the notification information may be carried in the independent signaling for transmitting, and the original configuration form between the base station and the terminal is not needed, which may reduce the number of signaling interactions required between the base station and the terminal, and improve the communication efficiency between the base station and the terminal.

Figure 7:
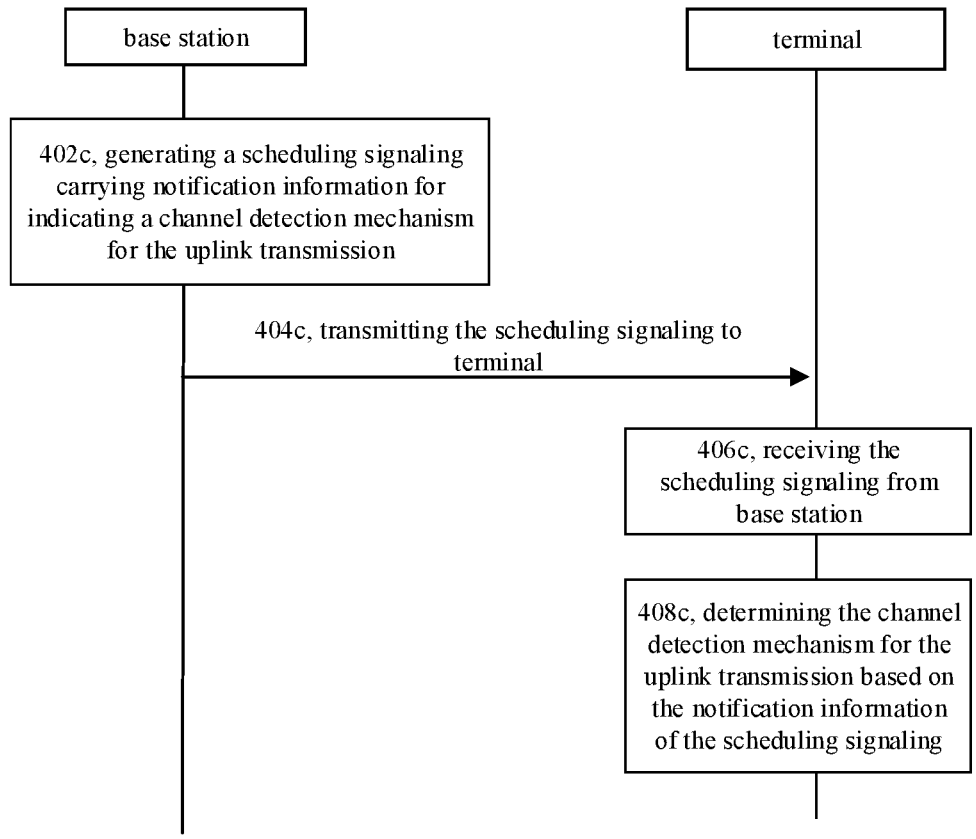
FIG. 7 is a flowchart illustrating a method for determining a channel detection mechanism according to another exemplary embodiment of the disclosure.

Based on optional embodiments in FIG. 4, for the uplink transmission of the scheduling type, the method includes the following as illustrated in FIG. 7.

At block 402c, the base station generates a scheduling signaling carrying notification information. The notification information is configured to indicate a channel detection mechanism for the uplink transmission.

Optionally, the base station stores a corresponding relationship. The corresponding relationship is relationships between types of uplink transmission and channel detection mechanisms. The base station determines the channel detection mechanism corresponding to the type of the current uplink transmission based on the corresponding relationship, and further generates the notification information.

The scheduling signaling is configured to dynamically configure the transmission type of uplink transmission, the used time frequency resource, the used cycle, etc.

In some embodiments, the scheduling signaling further carries the notification information. Optionally, the notification information has a fixed information domain length or a configurable information domain length. For example, the terminal supports Cat.1, Cat.2, Cat.3 and Cat.4 on the unlicensed frequency band, and 2-bit indication information may be configured to indicate the channel detection mechanism as illustrated in Table-3.

TABLE-3

| Notification Information | Type of Channel Detection Mechanism |
|---|---|
| 00 | LBT Cat.1 |
| 01 | LBT Cat.2 |
| 10 | LBT Cat.3 |
| 11 | LBT Cat.4 |

Optionally, the corresponding relationship as illustrated in the above Table may be pre-determined or pre-configured. In some embodiments of the disclosure, pre-determined refers to pre-determined by a communication protocol, and pre-configured refers to pre-configured by the base station to the terminal.

At block 404c, the base station transmits the scheduling signaling to the terminal.

Figure 8:
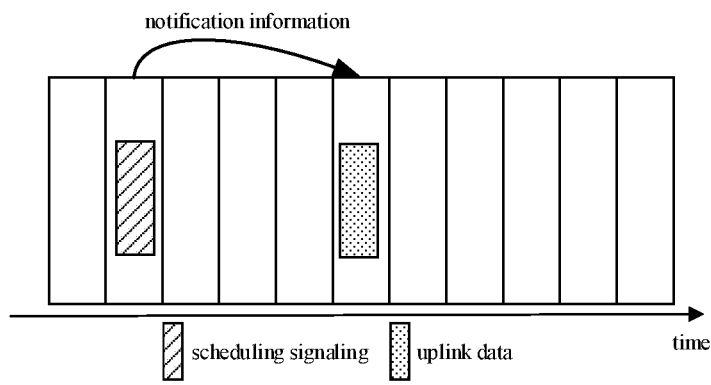
FIG. 8 is a diagram illustrating a schematic example of a method for determining a channel detection mechanism according to the embodiment in FIG. 7.

The scheduling signaling may be downlink control information (DCI), and the scheduling information is transmitted before uplink data as illustrated in FIG. 8.

At block 406c, the terminal receives the scheduling signaling from the base station.

At block 408c, the terminal determines the channel detection mechanism configured for uplink transmission based on the notification information of the scheduling signaling.

In summary, with the method provided in the embodiments, the notification information may be carried in the scheduling signaling for transmitting, which may reduce the number of signaling interactions between the base station and the terminal, and improve the communication efficiency between the base station and the terminal.

In optional embodiments based on the embodiments of FIG. 4 or FIG. 5 or FIG. 6 or FIG. 7, when the channel occupation duration corresponding to the uplink transmission is initiated by the base station, the terminal performs the uplink transmission in the channel occupation duration initiated by the base station. In this case, the base station transmits the notification information to the terminal and the terminal determines the channel detection mechanism based on the notification information.

Optionally, "initiate" refers to a behavior that the wireless communication device performs the LBT and occupies channel resources after the LBT is successful. The wireless communication device may be the base station, or may be the terminal.

Figure 9:
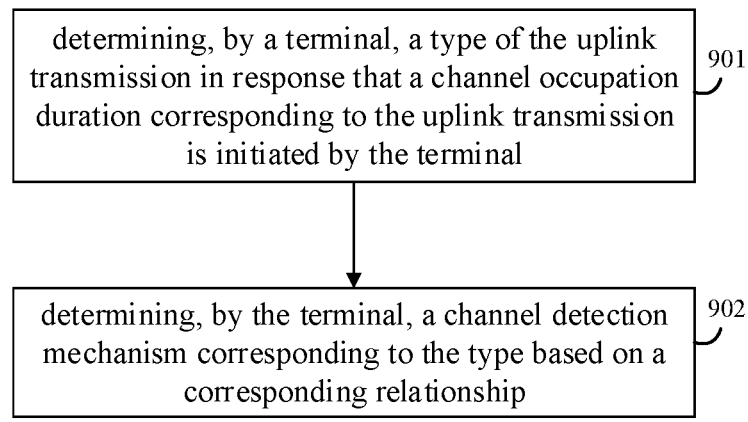
FIG. 9 is a flowchart illustrating a method for determining a channel detection mechanism according to another exemplary embodiment of the disclosure.

In some embodiments, when the channel occupation duration corresponding to the uplink transmission is initiated by the terminal, the terminal itself determines the channel detection mechanism. FIG. 9 is a flowchart illustrating a method for determining a channel detection mechanism according to an exemplary embodiment of the disclosure. The method may be executed by the terminal. The method includes the following.

At block 901, the terminal determines a type of the uplink transmission in response that a channel occupation duration corresponding to the uplink transmission is initiated by the terminal.

The type of the uplink transmission includes a type of an uplink control signaling and/or a type of uplink data.

At block 902, the terminal determines a channel detection mechanism corresponding to the type based on a corresponding relationship.

Optionally, the corresponding relationship is pre-determined by a communication protocol; or, the corresponding relationship is configured by the base station to the terminal. That is, the terminal determines the channel detection mechanism based on the type of the uplink control signaling and/or the uplink data needing to be transmitted. For example, transmissions of types of different uplink control signalings need different channel detection mechanisms.

Optionally, each channel detection mechanism has the corresponding channel access priority.

It should be noted that, the channel detection is performed through a channel detection mechanism with the lowest channel access priority in the plurality of determined channel detection mechanisms when at least two types of different uplink control signalings/or uplink data types require continuous transmissions in the channel occupancy duration initiated by the terminal.

Figure 10:
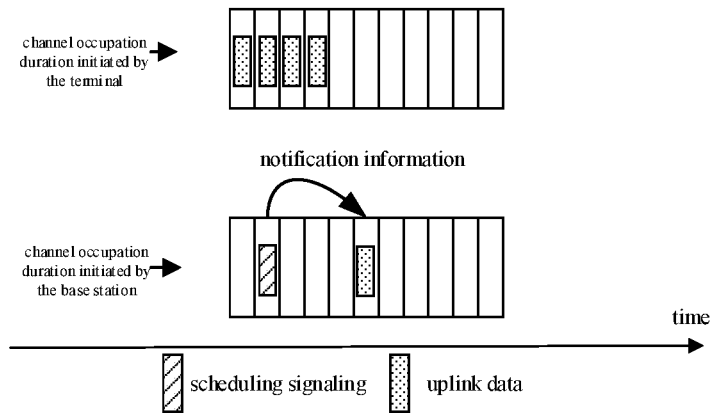
FIG. 10 is a diagram illustrating a schematic example of a method for determining a channel detection mechanism according to the embodiment in FIG. 9.

Comparing of the scenario of the channel occupation duration initiated by the base station and the scenario of the channel occupation duration initiated by the terminal may refer to FIG. 10. The way of determining the channel detection mechanism by the terminal itself may enable the terminal to occupy the uplink channel for the uplink transmission faster, thereby reducing a time delay of the uplink transmission.

The following are apparatus embodiments of the disclosure. The apparatus embodiments may correspond to the above method embodiments. For the details not described in the apparatus embodiments, it may refer to the above method embodiments, which is not repeated herein.

Figure 11:
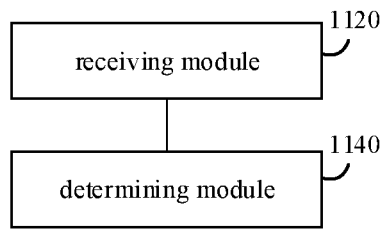
FIG. 11 is a block diagram illustrating an apparatus for determining a channel detection mechanism according to an exemplary embodiment of the disclosure.

FIG. 11 is a block diagram illustrating an apparatus for determining a channel detection mechanism according to an exemplary embodiment of the disclosure. The apparatus may be implemented as a part of a terminal. The apparatus is applicable to a scenario of uplink transmission through an uplink channel of an unlicensed spectrum. The apparatus includes a receiving module 1120 and a determining module 1140.

The receiving module 1120 is configured to receive notification information from a base station.

The determining module 1140 is configured to determine a channel detection mechanism for the uplink transmission based on the notification information.

In optional embodiments, the uplink transmission is an uplink transmission of a configuration type; and the receiving module 1120 is configured to receive a configuration signaling from the base station, the configuration signaling being a configuration signaling corresponding to the uplink transmission, the configuration signaling carrying the notification information; or, the receiving module 1120 is configured to receive an independent signaling from the base station, the independent signaling being a signaling different from the configuration signaling, the independent signaling carrying the notification information.

In optional embodiments, the uplink transmission is an uplink transmission of a scheduling type; and the receiving module 1120 is configured to receive a scheduling signaling from the base station, the scheduling signaling being a scheduling signaling corresponding to the uplink transmission, the scheduling signaling carrying the notification information at a preset location.

In optional embodiments, the receiving module 1120 is configured to, receive the notification information from the base station in response that a channel occupation duration corresponding to the uplink transmission is initiated by the base station.

Figure 12:
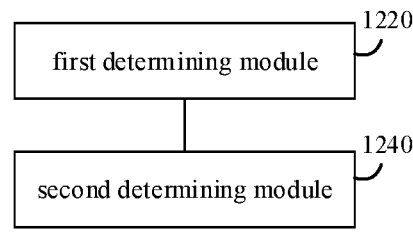
FIG. 12 is a block diagram illustrating an apparatus for determining a channel detection mechanism according to an exemplary embodiment of the disclosure.

FIG. 12 is a block diagram illustrating an apparatus for determining a channel detection mechanism according to an exemplary embodiment of the disclosure. The apparatus may be implemented as a part of a terminal. The apparatus is applicable to a scenario of uplink transmission through an uplink channel of an unlicensed spectrum. The apparatus includes a first determining module 1220 and a second determining module 1240.

The first determining module 1220 is configured to determine a type of the uplink transmission in response that a channel occupation duration corresponding to the uplink transmission is initiated by the terminal.

The second determining module 1240 is configured to determine a channel detection mechanism corresponding to the type based on a corresponding relationship.

Optionally, the corresponding relationship is pre-determined by a communication protocol; or, the corresponding relationship is configured by a base station to the terminal.

In optional embodiments, the second determining module 1240 is further configured to perform the channel detection through a channel detection mechanism with the lowest channel access priority in the plurality of determined channel detection mechanisms when at least two types of different uplink control signaling or uplink data require continuous transmissions in the channel occupation duration initiated by the terminal.

Figure 13:
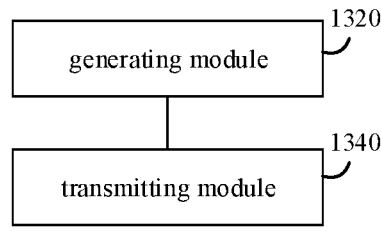
FIG. 13 is a block diagram illustrating an apparatus for determining a channel detection mechanism according to an exemplary embodiment of the disclosure.

FIG. 13 is a block diagram illustrating an apparatus for determining a channel detection mechanism according to an exemplary embodiment of the disclosure. The apparatus may be implemented as a part of a base station. The apparatus is applicable to a scenario of uplink transmission through an uplink channel of an unlicensed spectrum. The apparatus includes a generating module 1320 and a transmitting module 1340.

The generating module 1320 is configured to generate notification information for indicating a channel detection mechanism for the uplink transmission.

The transmitting module 1340 is configured to transmit the notification information to a terminal to determine the channel detection mechanism for the uplink transmission.

In optional embodiments, the uplink transmission is an uplink transmission of a configuration type; and the transmitting module 1340 is configured to transmit a configuration signaling to the terminal, the configuration signaling being a configuration signaling corresponding to the uplink transmission, the configuration signaling carrying the notification information; or, the transmitting module 1340 is configured to transmit an independent signaling to the terminal, the independent signaling being a signaling different from the configuration signaling, the independent signaling carrying the notification information.

In optional embodiments, the uplink transmission is an uplink transmission of a scheduling type; and the transmitting module 1340 is configured to transmit a scheduling signaling to the terminal, the scheduling signaling being a scheduling signaling corresponding to the uplink transmission, the scheduling signaling carrying the notification information at a preset location.

In optional embodiments, the transmitting module 1340 is configured to, transmit the notification information to the terminal in response that a channel occupation duration corresponding to the uplink transmission is initiated by the base station.

Figure 14:
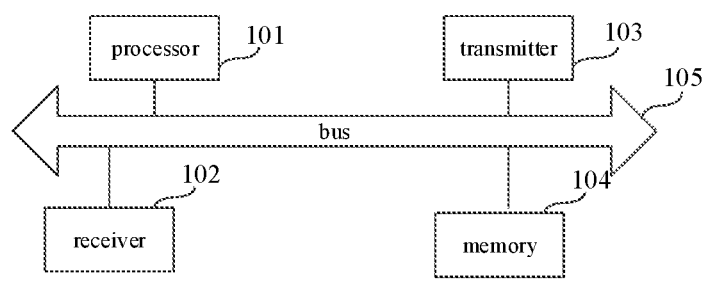
FIG. 14 is a block diagram illustrating a wireless communications device according to another exemplary embodiment of the disclosure.

FIG. 14 is a block diagram illustrating a wireless communications device according to another exemplary embodiment of the disclosure. The wireless communication device may be a terminal or a base station. The wireless communication device includes a processor 101, a receiver 102, a transmitter 103, a memory 104 and a bus 105.

The processor 101 includes one or more processing cores, and the processor 101 executes various function applications and information processing by running software programs or modules.

The receiver 102 and the transmitter 103 may be implemented as a communication component, which may be a communication chip.

The memory 104 is coupled to the processor 101 through the bus 105.

The memory 104 may be configured to store at least one instruction, and the processor 101 is configured to execute the at least one instruction to implement all actions in the blocks in the above embodiments.

In addition, the memory 104 may be implemented by any type of volatile or non-volatile storage devices or their combination. The volatile or non-volatile storage device includes but is not limited to a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an exemplary embodiment, a non-transitory computer-readable storage medium including instructions is further provided, such as the memory including instructions, in which the instructions may be executed by the processor to complete all actions in the blocks of the above method embodiments. For example, the non-transitory computer-readable storage medium may be a ROM, a random access memory (RAM), a CD-ROM, a magnetic tape, a floppy disk, an optical data storage device, etc.

A non-transitory computer-readable storage medium is further provided. When the instructions in the non-transitory computer-readable storage medium are executed by the processor, the terminal is caused to execute the method for determining the channel detection mechanism.

The serial numbers of the above embodiments may be only for the purpose of description and may not represent the advantages and disadvantages of the embodiments.

Those skilled in the art may understand that all or part of the actions in the above embodiments may be implemented by hardware, or by a program to instruct relevant hardware, in which the program may be stored in a computer-readable storage medium which may be a read-only memory, a magnetic disk or an optical disk, etc.

The above are only some embodiments in embodiments of the disclosure, and may not constitute the limitation of the disclosure. Any modification, equivalent replacement, improvement, etc., made within the spirit and principle of embodiments of the disclosure shall be included within the protection scope of embodiments of the disclosure.

What is claimed is:

1. A method for determining a channel detection mechanism, for a scenario of uplink transmission through an uplink channel of an unlicensed spectrum, comprising:

generating, by a base station, an independent signaling carrying notification information, wherein the notification information indicates a channel detection mechanism for the uplink transmission;
transmitting, by the base station, the independent signaling to a terminal;
receiving, by the terminal, the independent signaling from the base station;
determining, by the terminal, the channel detection mechanism for the uplink transmission based on the notification information of the independent signaling;
determining, by the terminal, a type of the uplink transmission in response that a channel occupation duration corresponding to the uplink transmission is initiated by the terminal, wherein the type of the uplink transmission comprises a type of an uplink control signaling and/or a type of uplink data;
when at least two different types of uplink transmission require continuous transmissions in the channel occupancy duration initiated by the terminal, and the at least two different types of uplink transmission comprises a first type of uplink transmission and a second type of uplink transmission, determining, by the terminal, a first channel detection mechanism corresponding to the first type of uplink transmission and a second channel detection mechanism corresponding to the second type of uplink transmission based on a corresponding relationship; wherein the first channel detection mechanism and the second channel detection mechanism are respectively one of: no listen before talk (LBT), an LBT mechanism without a random backoff, an LBT mechanism with a random backoff and a fixed contention window size (CWS), an LBT mechanism with a random backoff and a variable CWS and a channel detection mechanism based on a frame structure, and the first channel detection mechanism is different from the second channel detection mechanism; and
determining, by the terminal, a channel detection mechanism with a lowest channel access priority in the first channel detection mechanism and the second channel detection mechanism as a channel detection mechanism used in the channel occupation duration,
wherein the first type of uplink transmission is the type of the uplink control signaling, and the second type of uplink transmission is the type of the uplink data; wherein the uplink control signaling comprises control signalings carried on a physical uplink control channel (PUCCH) and a physical uplink shared channel (PUSCH), and some pilot signals for measurement, the uplink data comprises data carried on the PUSCH.

2. The method as claimed in claim 1, wherein,
the corresponding relationship is pre-determined by a communication protocol;
or,
the corresponding relationship is configured by the base station to the terminal.

3. A system, comprising a base station and a terminal, wherein the base station comprises:
a processor;
a transceiver coupled to the processor; and
a memory configured to store instructions executable by the processor;
wherein the processor is configured to load and execute the instructions executable to perform:
generating an independent signaling carrying notification information, wherein the notification information indicates a channel detection mechanism for the uplink transmission;
transmitting the independent signaling to the terminal;

the terminal comprises:
a processor;
a transceiver coupled to the processor; and
a memory configured to store instructions executable by the processor;
wherein, the processor is configured to load and execute the instructions executable to perform:
receiving the independent signaling from the base station;
determining, by the terminal, the channel detection mechanism for the uplink transmission based on the notification information of the independent signaling;
determining a type of the uplink transmission in response that a channel occupation duration corresponding to the uplink transmission is initiated by the terminal, wherein the type of the uplink transmission comprises a type of an uplink control signaling and/or a type of uplink data;
when at least two different types of uplink transmission require continuous transmissions in the channel occupancy duration initiated by the terminal, and the at least two different types of uplink transmission comprises a first type of uplink transmission and a second type of uplink transmission, determining a first channel detection mechanism corresponding to the first type of uplink transmission and a second channel detection mechanism corresponding to the second type of uplink transmission based on a corresponding relationship; wherein the first channel detection mechanism and the second channel detection mechanism are respectively one of: no listen before talk (LBT), an LBT mechanism without a random backoff, an LBT mechanism with a random backoff and a fixed contention window size (CWS), an LBT mechanism with a random backoff and a variable CWS and a channel detection mechanism based on a frame structure, and the first channel detection mechanism is different from the second channel detection mechanism; and
determining a channel detection mechanism with a lowest channel access priority in the first channel detection mechanism and the second channel detection mechanism as a channel detection mechanism used in the channel occupation duration,
wherein the first type of uplink transmission is the type of the uplink control signaling, and the second type of uplink transmission is the type of the uplink data; wherein the uplink control signaling comprises control signalings carried on a physical uplink control channel (PUCCH) and a physical uplink shared channel (PUSCH), and some pilot signals for measurement, the uplink data comprises data carried on the PUSCH.

4. The system as claimed in claim 3, wherein,
the corresponding relationship is pre-determined by a communication protocol;
or,
the corresponding relationship is configured by the base station to the terminal.

5. A non-transitory computer-readable storage medium, wherein the computer-readable storage medium stores at least one instruction, at least one program, a code set and an instruction set, the at least one instruction, the at least one program, the code set or the instruction set being loaded and executed by a processor of a base station and a processor of a terminal to perform a method for determining a channel detection mechanism, for a scenario of uplink transmission through an uplink channel of an unlicensed spectrum, comprising:
generating, by the base station, an independent signaling carrying notification information, wherein the notification information indicates a channel detection mechanism for the uplink transmission;

transmitting, by the base station, the independent signaling to the terminal;

receiving, by the terminal, the independent signaling from the base station;

determining, by the terminal, the channel detection mechanism for the uplink transmission based on the notification information of the independent signaling;

determining, by the terminal, a type of the uplink transmission in response that a channel occupation duration corresponding to the uplink transmission is initiated by the terminal, wherein the type of the uplink transmission comprises a type of an uplink control signaling and/or a type of uplink data;

when at least two different types of uplink transmission require continuous transmissions in the channel occupancy duration initiated by the terminal, and the at least two different types of uplink transmission comprises a first type of uplink transmission and a second type of uplink transmission, determining, by the terminal, a first channel detection mechanism corresponding to the first type of uplink transmission and a second channel detection mechanism corresponding to the second type of uplink transmission based on a corresponding relationship; wherein the first channel detection mechanism and the second channel detection mechanism are respectively one of: no listen before talk (LBT), an LBT mechanism without a random backoff, an LBT mechanism with a random backoff and a fixed contention window size (CWS), an LBT mechanism with a random backoff and a variable CWS and a channel detection mechanism based on a frame structure, and the first channel detection mechanism is different from the second channel detection mechanism; and determining, by the terminal, a channel detection mechanism with a lowest channel access priority in the first channel detection mechanism and the second channel detection mechanism as a channel detection mechanism used in the channel occupation duration, wherein the first type of uplink transmission is the type of the uplink control signaling, and the second type of uplink transmission is the type of the uplink data; wherein the uplink control signaling comprises control signalings carried on a physical uplink control channel (PUCCH) and a physical uplink shared channel (PUSCH), and some pilot signals for measurement, the uplink data comprises data carried on the PUSCH.

6. The non-transitory computer-readable storage medium as claimed in claim 3, wherein, the corresponding relationship is pre-determined by a communication protocol;

or, the corresponding relationship is configured by the base station to the terminal.

* * * * *